Feb. 10, 1942. J. W. TEKER 2,272,757
BEARING AND SUPPORTING STRUCTURE
Filed Dec. 19, 1940
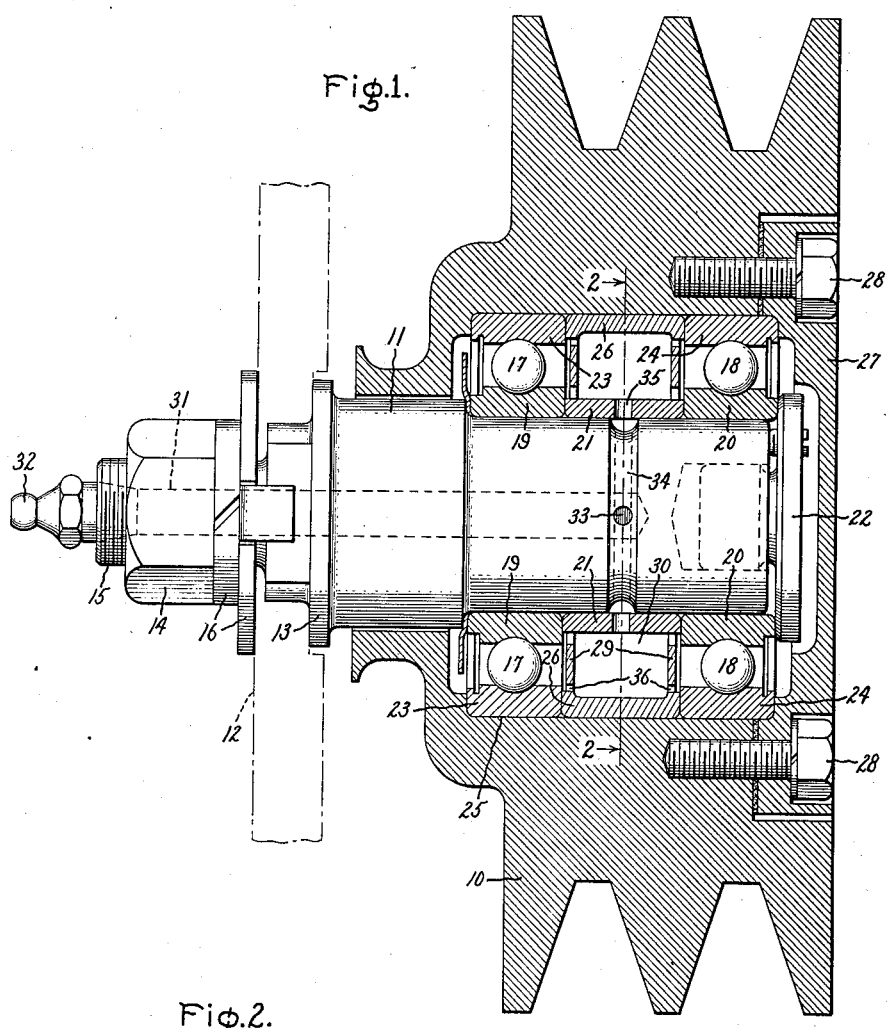
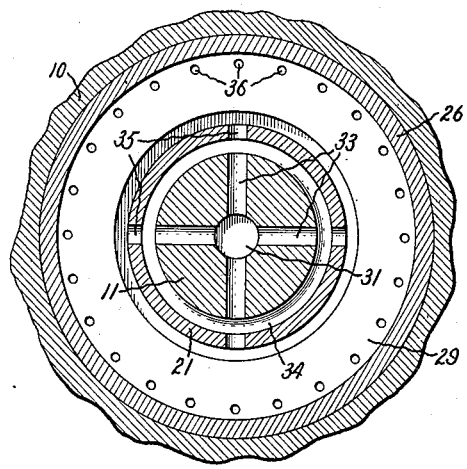
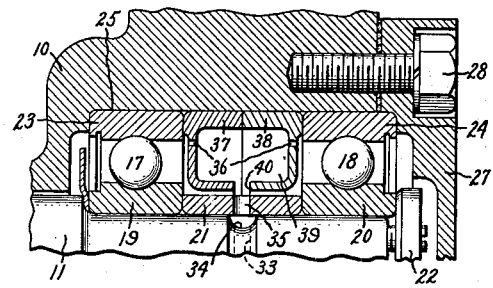
Inventor:
John W. Teker,
by Harry E. Dunham
His Attorney.

UNITED STATES PATENT OFFICE 2,272,757

BEARING AND SUPPORTING STRUCTURE

John W. Tcker, Wesleyville, Pa., assignor to General Electric Company, a corporation of New York Application December 19, 1940, Serial No. 370,817

7 Claims. (Cl. 308—187)

My invention relates to bearings and supporting structures for rotatable members and to improved lubricating systems for such supports.

An object of my invention is to provide an improved supporting structure and lubricating arrangement for a rotatable member.

Another object of my invention is to provide an improved anti-friction bearing construction.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a sectional side elevational view of an embodiment of my invention as applied to the support of the rotatable pulley upon a stationary stub shaft; Fig. 2 is a sectional view taken along line 2—2 of Fig. 1, and Fig. 3 is a sectional partial side elevational view of a modification of the construction shown in Fig. 1.

Referring to the drawing, I have shown an embodiment of my invention applied to the support of a rotatable V-groove pulley 10 upon a stationary stub shaft 11. The stub shaft extends through an opening in a mounting structure 12 and is formed with a shoulder 13 arranged to engage one side of the mounting structure 12 and is rigidly held against this structure by a nut 14 which threadedly engages an end 15 of the shaft 11 and is drawn up tightly against a set of washers 16 arranged between the nut and the mounting structure 12 on the opposite side of the mounting structure from the shoulder 13.

The rotatable pulley 10 is supported upon the stub shaft 11 by a supporting structure which includes an improved anti-friction bearing construction utilizing a pair of axially spaced apart ball bearings 17 and 18. These bearings are provided with inner relatively stationary bearing races 19 and 20 arranged in axially spaced apart relationship and maintained in their respective positions by an annular inner spacer member 21 arranged between the adjacent sides of these races. An end cap 22 is secured to the end of the stub shaft 11 and engages the outer edge of the inner bearing race 20, so as to secure the inner bearing race assembly upon the stub shaft. The bearings 17 and 18 also are provided with outer bearing races 23 and 24 respectively, mounted within an annular opening 25 formed in the pulley 10. These outer bearing races are maintained in axially spaced apart relationship by an outer channel section spacer member 26 arranged between the adjacent sides of the outer bearing races. This outer bearing race assembly is rigidly secured in position within the pulley 10 by a pulley end cap 27 which engages the outer edge of the bearing race 24 and is secured to the pulley 10 by a plurality of bolts 28 threadedly engaged in complementary openings in the pulley. The sides 29 of the outer channel section spacer member 26 are arranged adjacent the bearings 17 and 18 and extend toward the inner spacer member 21 forming baffles to provide a lubricant reservoir 30 adapted to contain lubricant for the bearings 17 and 18. These baffles also prevent the churning of the bulk of the grease in the reservoir 30 and prevent the return of churned grease from the ball bearings into the reservoir.

I provide an arrangement for supplying the desired amount of lubricant to the bearings 17 and 18 by providing an axially extending supply passage 31 through the stationary stub shaft 11 and provide a grease fitting 32 at the outer end thereof. The inner end of the supply passage 31 communicates with a plurality of radial openings 33 which extend outwardly and communicate with a circumferentially extending groove 34 formed on the outer surface of the stationary stub shaft. The inner spacer member 21 is adapted to enclose the groove 34 and is provided with lubricant supply openings 35 arranged in communication with the groove 34 to provide for the passage of lubricant into the lubricant reservoir 30. In order to supply the desired amount of lubricant to the bearings, a plurality of restricted metering openings 36 is formed adjacent the outer edges of the baffle side elements 29 of the outer spacer member 26, so that as the pulley 10 rotates, the grease in the reservoir 30 rotates with the pulley and centrifugal force will cause a restricted amount of grease to pass from the reservoir 30 through the openings 36 into the space between the inner and outer races of the anti-friction bearings to lubricate the same.

The modification of my invention shown in Fig. 3 includes an improved supporting arrangement for a V-groove pulley 10 upon a stationary stub shaft 11 similar to the arrangement shown in Fig. 1. This rotatable pulley is supported on the stub shaft 11 by a pair of anti-friction ball bearings 17 and 18 provided with inner relatively stationary bearing races 19 and 20 arranged in axially spaced apart relationship. These races are held in their spaced apart relationship by an inner spacer member 21 arranged between the adjacent sides of the races and are secured in position by an end cap 22 secured to the end of the stub shaft 11 and arranged in engagement with the outer side of the bearing race 20. The bearings 17 and 18 support the pulley 10 on outer bearing races 23 and 24, respectively, mounted in an annular opening 25 formed in the pulley. These outer bearing races are held in axially spaced apart relationship by a spacer element comprising a pair of complementary channel section spacer members 37 and 38 which are formed with an outer cylindrical wall which is slightly longer than the inner cylindrical wall thereof. A pulley end cap 27 is secured in position on the end of the pulley 10 by a plurality of bolts 28 which threadedly engages openings in the pulley, and this cap is arranged in engagement with the outer edge of the outer bearing race 24 so as to clamp securely the outer race 24 against the outer side of the spacer element 38 to secure rigidly the outer races 23 and 24 in position within the pulley. In this position, the outer cylindrical sides of the spacer elements 37 and 38 are held in engagement so as to form a closed outer wall for a lubricant reservoir 39 formed between the two spacer elements.

As in the arrangement shown in Fig. 1, lubricating grease is adapted to be supplied to the lubricant reservoir 39 through the stub shaft 11 and to pass radially outwardly through radially extending openings 33 formed in the shaft 11 and into a circumferentially extending groove 34 formed in the outer periphery of the shaft. The grease is adapted to pass from this groove 34 through a plurality of openings 35 formed in the inner spacer element 21 and then through an annular space 40 between the inner cylindrical walls of the spacer elements 37 and 38 into the reservoir 39. With such a construction, the grease in the reservoir 39 is adapted to rotate with the pulley 10 such that centrifugal force will urge the grease towards the outer side of the reservoir. Restricted metering openings 36 are formed in each of the spacer members 37 and 38 adjacent the outer sides thereof such that on rotation of the spacer elements with the pulley, centrifugal force will cause a restricted amount of grease to pass from the reservoir 39 through the openings 36 into the space between the inner and outer races of the anti-friction bearings to lubricate the same. This construction has the advantage of insuring against churning of the inner portion of the grease in the reservoir about the spacer element 21, as the inner walls of the outer spacer members 37 and 38 form a substantially closed partition wall which rotates with the grease between the reservoir 39 and the inner spacer element 21.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. An anti-friction bearing construction including a pair of complementary inner and outer bearing races with anti-friction bearing members movably mounted between said races, a second pair of complementary inner and outer bearing races with anti-friction bearing members movably mounted between said second pair of races, and members arranged axially between axially adjacent races adapted to maintain said inner races and said outer races in axially spaced apart relation and to provide a lubricant reservoir therebetween, said spacing member between said outer bearing races having baffle elements formed with restricted openings therein arranged to provide for a restricted passage of lubricant from said reservoir to said bearings.

2. A supporting structure including a stationary member and a rotatable member, a plurality of anti-friction bearings having relatively stationary bearing races mounted in spaced apart relation on said stationary member and relatively rotatable races mounted in spaced apart relation on said rotatable member, a spacer member arranged between said relatively stationary races, and a second spacer member arranged between said rotatable races and having a baffle element formed on each side thereof adjacent said bearings extending toward said first-mentioned spacer member forming a lubricant reservoir therebetween, said baffle elements being formed with restricted openings therein adapted to allow a restricted passage of lubricant from said reservoir to said bearings.

3. A supporting structure including an inner stationary member and an outer rotatable member, a plurality of anti-friction bearings having stationary inner bearing races mounted in spaced apart relation on said stationary member and rotatable outer races mounted in spaced apart relation on said rotatable member, a spacer member arranged between said inner bearing races, and a second spacer member arranged between said outer bearing races and having a baffle element formed on each side thereof extending toward said first-mentioned spacer member forming a lubricant reservoir therebetween, said baffle elements being formed with restricted openings therein adapted to allow a restricted passage of lubricant from said reservoir to said bearings.

4. An anti-friction bearing construction including a pair of complementary bearing races with anti-friction bearing members mounted therebetween, a second pair of complementary bearing races with anti-friction bearing members mounted therebetween, a spacer member arranged between a bearing race of said first-mentioned pair of bearing races and an adjacent race of said second pair of bearing races, and a second spacer member arranged between the others of said bearing races with sides thereof extending toward said first-mentioned spacer member forming baffles to provide a lubricant reservoir therebetween, said baffles being formed with a plurality of circumferentially spaced apart restricted openings adapted to allow a restricted passage of lubricant from said reservoir to said bearings.

5. An anti-friction bearing construction including a pair of complementary inner and outer bearing races with anti-friction bearing members movably mounted between said races, a second pair of complementary inner and outer bearing races with anti-friction bearing members movably mounted between said second pair of races, an inner annular spacer member arranged between said inner bearing races, and an annular channel section spacer member arranged between said outer bearing races with the sides thereof extending toward said inner spacer member forming baffles adjacent said bearings to provide a lubricant reservoir therebetween, said baffles being formed with restricted openings therein adapted to allow a restricted passage of lubricant from said reservoir to said bearings.

6. A supporting structure including an inner stationary member and an outer rotatable member, a plurality of anti-friction bearings having inner bearing races mounted in spaced apart relation on said stationary member and outer bearing races mounted in spaced apart relation on said rotatable member, an inner spacer member arranged between said inner bearing races, a lubricant supply passage formed through said stationary member arranged in communication with a groove formed on the outer surface of said stationary member and adapted to be enclosed by said inner spacer member, lubricant supply openings formed in said inner spacer member arranged in communication with said groove to provide for the passage of lubricant therethrough and a second spacer member arranged between said outer bearing races having a baffle element on each side thereof extending towards said first-mentioned spacer member forming a lubricant reservoir therebetween, said baffle elements being formed with restricted openings therein adapted to allow a restricted passage of lubricant from said reservoir to said bearings.

7. A supporting structure including an inner stationary member and an outer rotatable member, a plurality of anti-friction bearings having inner bearing races mounted in spaced apart relation on said stationary member and outer bearing races mounted in spaced apart relation on said rotatable member, an inner spacer member arranged between said inner bearing races, a lubricant supply passage formed axially through said stationary member with outwardly extending openings arranged in communication therewith and with a circumferentially extending groove formed on the outer surface of said stationary member and adapted to be enclosed by said stationary spacer member, lubricant supply openings formed in said stationary spacer member and arranged in communication with said circumferentially extending groove to provide for the passage of lubricant therethrough, and a second spacer member arranged between said outer bearing races having a baffle element on each side thereof adjacent said bearings extending towards said first-mentioned spacer member forming a lubricant reservoir therebetween, said baffle elements being formed with restricted openings therein adapted to allow a restricted passage of lubricant from said reservoir to said bearings.

JOHN W. TEKER.